E. E. BRYANT.
FLUID PRESSURE STEERING APPARATUS.
APPLICATION FILED AUG. 5, 1910.
1,036,071.
Patented Aug. 20, 1912.
2 SHEETS—SHEET 1.
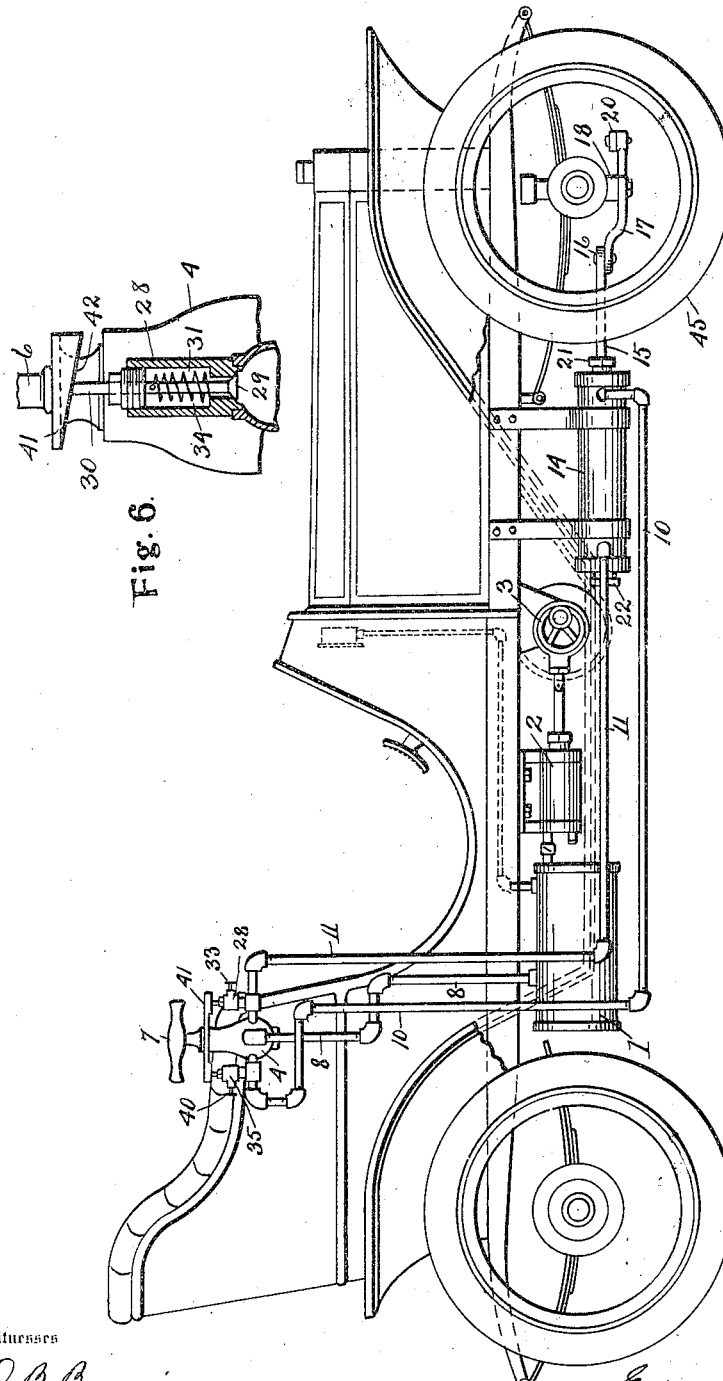

E. E. BRYANT.
FLUID PRESSURE STEERING APPARATUS.
APPLICATION FILED AUG. 5, 1910.
1,036,071.
Patented Aug. 20, 1912.
2 SHEETS—SHEET 2.
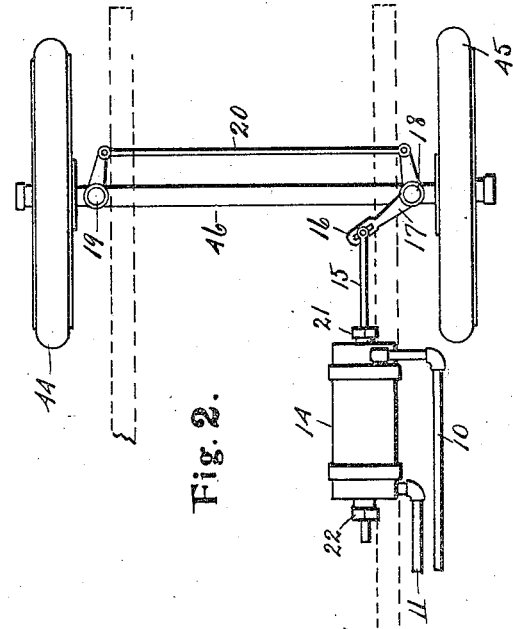
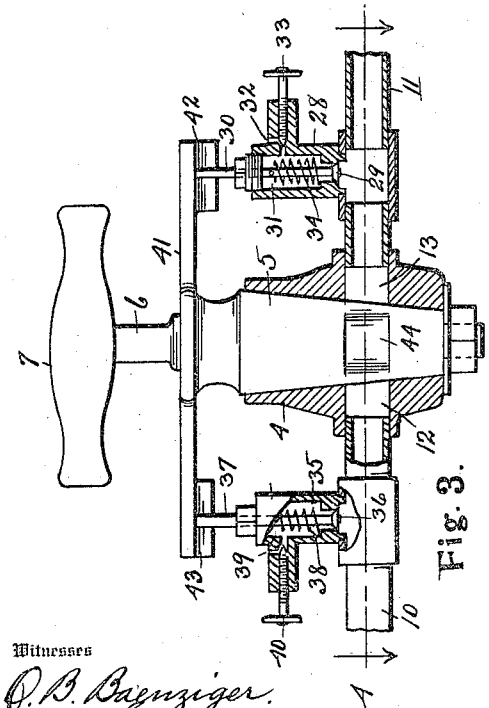
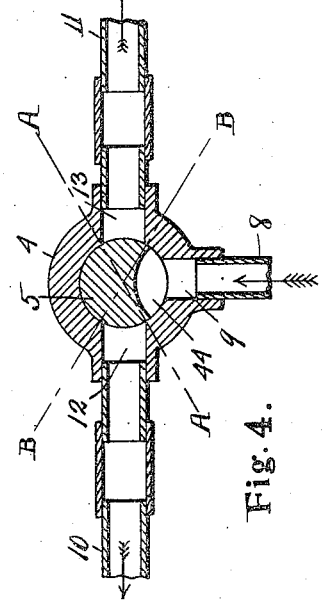
Witnesses
O. B. Baenziger.
J. G. Howlett.
Inventor
Edward E. Bryant.
By T. W. Wheeler, Attorney.

UNITED STATES PATENT OFFICE.

EDWARD E. BRYANT, OF CHICAGO, ILLINOIS.

FLUID-PRESSURE STEERING APPARATUS.

1,036,071.

Specification of Letters Patent. Patented Aug. 20, 1912.

Application filed August 5, 1910. Serial No. 575,778.

*To all whom it may concern:*

Be it known that I, EDWARD E. BRYANT, a citizen of the United States, residing at Chicago, in the county of Cook, State of Illinois, have invented certain new and useful Improvements in Fluid-Pressure Steering Apparatus; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to steering mechanism for motor vehicles, and consists in the construction and arrangement of parts hereinafter more fully set forth and pointed out particularly in the claims.

The object of the invention is to provide simple, efficient and economical means for operating the steering device of a motor vehicle through the medium of fluid under pressure, provision being made for placing the control of the actuating mechanism conveniently within reach of the operator or driver and for operating said controlling means with but little physical effort, and the arrangement being such as to dispense with the ordinary steering wheel and steering post, and to obviate shock and vibration to the hands of the driver, as in the construction commonly employed.

The above object is attained by the mechanism illustrated in the accompanying drawings, in which:—

Figure 1 illustrates one embodiment of my invention, as employed in actuating the steering mechanism of an automobile. Fig. 2 is a fragmentary view in plan, showing the connection of the piston rod of the fluid pressure cylinder with an arm on the steering knuckle of an automobile. Fig. 3 is a view partly in section of the controlling valve and the pipes leading therefrom. Fig. 4 is a horizontal section, as on line 4—4 of Fig. 3. Fig. 5 is a horizontal section through the cylinder and piston therein, the piston rod appearing in elevation. Fig. 6 is a fragmentary view in section, showing the incline on the arm of the controlling valve for actuating one of the exhaust valves.

Referring to the characters of reference, 1 designates a main pressure cylinder adapted to contain compressed air, or other fluid under pressure, which is forced thereinto by means of a pump 2 actuated by an eccentric 3 driven in any convenient manner. Mounted on the body of the car within convenient reach of the driver is a valve case 4 in which is seated a three way plug cock valve 5, the stem 6 of which is provided with an actuating handle 7. From the reservoir 1 a supply pipe 8 extends to the valve case 4 and communicates therewith through a port 9, as shown in Fig. 4. Leading from one side of the valve case is a pipe 10 and leading from the opposite side of said case is a pipe 11. The pipe 10 communicates with the valve case through a port 12, and pipe 11 communicates with the valve case through a port 13. The ports 12 and 13 are in the same horizontal plane as the port 9. The pipe 10 leads to and communicates with a cylinder 14 at one end, as shown in Fig. 5, and the pipe 11 leads to and communicates with the opposite end of said cylinder. The cylinder 14 may be secured to the frame of the car in any suitable manner and is provided with a piston rod 15. One end of the piston rod is jointedly connected, as shown at 16 in Fig. 2, with an arm 17 of the steering knuckle 18, the opposite steering knuckle 19 being connected thereto in the usual manner by the connecting rod 20. The ends of the piston rods project through the ends of the cylinder 14 and are embraced by suitable glands 21 and 22.

In order to obviate the leakage of air past the piston within the cylinder 14, I provide said cylinder with a specially constructed piston consisting of a central disk 23 fast to the piston rod and filling the diameter of the cylinder. On opposite sides of said central disk are compressible gaskets 24 and 25 formed of leather, or analogous material, and of a diameter to fill the bore of the cylinder. Loosely mounted upon the piston rod and bearing against said gaskets are metal disks 26 and 27. Said movable disks, by the pressure in the opposite ends of the cylinder, will be carried forcibly against the gaskets 24 and 25, whereby said gaskets will be compressed sufficiently to expand their peripheries forcibly into contact with the wall of the cylinder and effecting such a closure as to prevent the escape of fluid under pressure past the piston from one end of the cylinder to the other.

Communicating with the pipe 11 is a valve case 28 in which is seated an exhaust valve 29 having a stem 30 which projects through the upper end of said case. Within the valve case 28 is a chamber 31 from which leads a vent opening 32 controlled by a needle valve 33. By means of said needle valve the quantity of fluid under pressure which may escape through the vent opening 32 when the valve 29 is open, may be regulated. The valve 29 is normally held to its seat by the tension of a coiled spring 34, as clearly shown in Fig. 3. Communicating with the pipe 10 is a valve case 35 having therein an exhaust valve 36 whose stem 37 projects through the top of said case and which is normally seated by means of a coiled spring 38. Leading from the chamber of valve 36 is a vent opening 39 controlled by a needle valve 40. Connected with the stem of plug cock valve 5, which for convenience will be called the "controller valve", is a cross arm 41 provided at its ends with inclined planes 42 and 43, respectively, which bear upon the upper ends of the valve stems 30 and 37. In the body of valve 5 is a curved recess 44 which when the valve is in its normal position, will register with the port 9 of the supply pipe 8, the body of said valve in said position, closing the ports 12 and 13 communicating with the pipes 10 and 11, respectively, as clearly shown in Fig. 4. Assuming that the parts are in the positions shown in Figs. 3 and 4, a rotation of the valve stem to the right through the medium of the handle 7 will cause the recess 44 in said valve to register with the ports 9 and 12 and admit air from the main reservoir by way of pipe 8 to the forward end of the cylinder 14 by way of pipe 10. This movement of the valve stem will at the same time cause the inclined plane 42 at the end of the cross arm 41 to engage the upper end of valve stem 30 and depress said stem to unseat the exhaust valve 29, permitting air to exhaust through the vent opening 32 from pipe 11 and from the cylinder 14 on the rear side of the piston therein. By admitting reservoir pressure to the forward end of the cylinder 14 and exhausting the air from the rear end thereof, the piston will be moved rearwardly, thereby drawing upon the piston rod 15 and actuating the steering knuckles to swing the steering wheels 45 to the right. After actuating the piston as just described, the controller valve is returned to the neutral position shown in Fig. 4, thereby cutting off the reservoir pressure from the cylinder 14 and closing the ports 12 and 13 with which the cylinder pipes 10 and 11 communicate. The pressure on opposite sides of the piston in the cylinder will then become balanced, thereby holding the piston to the position to which it has been moved.

To turn the steering wheels in the opposite direction, the valve 5 is rotated to the left so as to place the ports 9 and 13 in communication with the recess 44 therein, a movement which allows pressure from the main reservoir to flow into the rear end of the cylinder 14 through pipe 11, at the same time carrying the inclined plane 43 on the cross arm into engagement with the upper end of the valve stem 37 and depressing said stem to open the valve 36, thereby allowing the air in pipe 10 to escape or exhaust through the vent opening 39 from the forward end of said cylinder, whereby the piston will be moved forwardly and the piston rod 15 actuated to turn the steering knuckles and the steering wheels to the left, after which operation the controller valve is returned to the neutral position shown in Fig. 4, again closing the ports 12 and 13, allowing the pressure in the cylinder on each side of the piston to become balanced, whereby the piston is held from movement in either direction and the steering wheels are maintained in the position to which they have been turned. When the piston is exactly in the center of cylinder 14, the steering wheels will be held at right angles to the front axle 46, the pressure in the opposite ends of said cylinder holding the wheels against turning in either direction, relieving the driver entirely from any physical exertion in either holding or actuating the steering apparatus and eliminating all jar and vibration from the hands of the driver.

It will be noted that as the controller valve is operated, one of the exhaust valves communicating with the cylinder pipes 10 and 11 is concurrently actuated to exhaust the air from the end of the cylinder toward which the piston is moved; the rapidity of said exhaust being entirely controlled by the needle valves 33 and 40. The pressure in the opposite ends of the cylinder 14 is so great that movement of the piston rod 15 is impossible except through a manipulation of the controller valve 5, thereby preventing an accidental turning of the steering wheels through encountering an obstruction or from other causes.

By means of this improved steering mechanism, the steering wheel and steering post are eliminated, making it possible for the driver to enter or leave the front seat on either side with equal facility.

In practice the cylinder pipes 10 and 11 and the supply pipe 8 leading to the main reservoir will be concealed in the frame of the body and the other parts so disposed as to obviate any objection on the ground of unsightliness, and at the same time enable the mechanism to be readily controlled by the driver. Instead of mounting the actuating cylinder 14, as shown, it may be disposed parallel with the front axle with the ends of the piston rods connected directly to the arms of the steering knuckles in place of the connecting rod 20.

Having thus fully set forth my invention, what I claim as new and desire to secure by Letters Patent, is:—

1. Fluid controlling mechanism for steering apparatus, comprising a controller valve, a projecting stem for manually actuating said valve, pipes connecting said controller valve through independent ports with the ends of a cylinder and with a source of fluid under pressure, said ports being normally closed by said controller valve, exhaust valves communicating with said cylinder pipes independently, and independently of the controller valve, means actuatable by a movement of the stem of the controller valve for actuating said exhaust valves alternately as the controller valve is successively turned in opposite directions to alternately open the ports of said cylinder pipes, and means independent of said opening means for closing said exhaust valves.

2. Fluid controlling mechanism for steering apparatus, comprising a controller valve, two pipes connecting said valve independently with the ends of a cylinder, a pipe connecting said valve with a pressure reservoir, said controller valve normally closing all of said pipes, spring seated exhaust valves in said connecting pipes leading to the cylinder independent of but located adjacent said controller valve, means carried by the stem of the controller valve and actuatable by a movement of said valve to open the exhaust valve only in the connecting pipe closed by the controller valve as said controller valve is manipulated to open communication with the other of said connecting pipes, and means for regulating the amount of fluid which may escape from the exhaust valve irrespective of the degree to which said valve may be opened.

3. Fluid controlling mechanism for steering apparatus, comprising a controller valve having a projecting stem through the medium of which it may be actuated, pipes normally closed by the controller valve connecting said valve with the ends of a cylinder and with a source of fluid pressure, exhaust valves in said cylinder pipes independent of the controller valve, said exhaust valve having projecting stems, and cams on the stem of the controller valve engaging with the stems of the exhaust valves and actuatable concurrently with the controller valve for opening the exhaust valve only in the pipe leading to the end of the cylinder opposite to that into which pressure is admitted as said controller valve is manipulated.

4. Fluid controlling mechanism for steering apparatus, comprising a controller valve, a stem for manually actuating said valve, pipes connecting said controller valve through independent ports with the ends of a cylinder, said ports being normally closed by said controller valve, exhaust valves communicating with said pipes independently and independently of the controller valve, means actuatable during the movement of the controller valve for gradually opening said exhaust valves alternately as the controller valve is successively operated in opposite directions to alternately open said connecting pipes, means independent of said opening means for closing the exhaust valves, and means for varying the volume of fluid discharge from said exhaust valves irrespective of the degree to which said valves may be opened.

5. Fluid controlling mechanism for steering apparatus, comprising a controller valve, pipes connecting the controller valve to the opposite ends of a cylinder, a spring-controlled exhaust valve communicating with each of said pipes, a stem connected with the controller valve for manually actuating it, and cams operatively associated with said exhaust valves and movable with the stem of the controller valve to successively actuate the exhaust valves as the stem of the controller valve is turned in opposite directions.

In testimony whereof, I sign this specification in the presence of two witnesses.

EDWARD E. BRYANT.

Witnesses:
O. B. BAENZIGER,
I. G. HOWLETT.